United States Patent
Perrone, Jr.

(10) Patent No.: US 6,662,487 B2
(45) Date of Patent: *Dec. 16, 2003

(54) ARTIFICIAL FISHING LURE WITH RESILIENT CORE

(76) Inventor: Jerome Frank Perrone, Jr., 22 Upland Way, Mattapoisett, MA (US) 02739

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/973,345

(22) Filed: Oct. 9, 2001

(65) Prior Publication Data

US 2003/0066232 A1 Apr. 10, 2003

(51) Int. Cl.[7] ............................................... A01K 85/00
(52) U.S. Cl. ...................... 43/42.04; 43/42.1; 43/42.22; 43/42.24; 43/42.34; 43/42.37
(58) Field of Search .............................. 43/42.37, 42.36, 43/42.1, 42.22, 42.24, 42.41, 43.1, 44.9, 44.92, 37, 42.04, 42.05

(56) References Cited

U.S. PATENT DOCUMENTS

| 1,777,004 A | * | 9/1930 | Lemere et al. ............... 43/42 |
| 2,119,417 A | * | 5/1938 | Brown ....................... 43/42.37 |
| 3,611,614 A | * | 10/1971 | Ward ......................... 43/42.24 |
| 3,868,784 A | * | 3/1975 | Sabol ........................ 43/42.23 |
| 4,312,148 A | | 1/1982 | Hardwicke |
| 4,592,161 A | | 6/1986 | Smith |
| 4,783,928 A | | 11/1988 | Weaver |
| 4,914,850 A | * | 4/1990 | Rice .......................... 43/42.24 |
| 4,976,060 A | * | 12/1990 | Nienhuis ................... 43/42.41 |
| 4,998,372 A | | 3/1991 | Reed |
| 5,007,194 A | | 4/1991 | Coody |
| 5,065,541 A | | 11/1991 | Coody |
| 5,142,811 A | | 9/1992 | Freeman |
| 5,678,350 A | * | 10/1997 | Moore ....................... 43/42.15 |
| 5,689,910 A | | 11/1997 | Kato |
| 5,893,231 A | | 4/1999 | Kato |
| 5,894,692 A | | 4/1999 | Firmin |
| 6,094,855 A | | 8/2000 | Stump |
| 6,141,900 A | * | 11/2000 | Rudolph ................... 43/42.24 |
| 6,170,190 B1 | | 1/2001 | Wilson |

* cited by examiner

*Primary Examiner*—Charles T. Jordan
*Assistant Examiner*—Tara M Golba

(57) ABSTRACT

Artificial fishing lure which has a flexible resilient core (10) surrounded by an elongated flexible body (12). One or more hooks (18) are installed in the core (10) substantially perpendicular to core (10) by way of apertures (24a) and (24b). The core (10) provides longevity to the lure for small and large lures when cast from rod and reel or trolled. Large of heavy lures of this design can be cast with great distances. Grooves (14) in the elongated flexible body (12) and core (10) create a predetermined or erratic motion during retrieval through the water. This action can simulate that of any type of prey including a wounded prey.

11 Claims, 6 Drawing Sheets

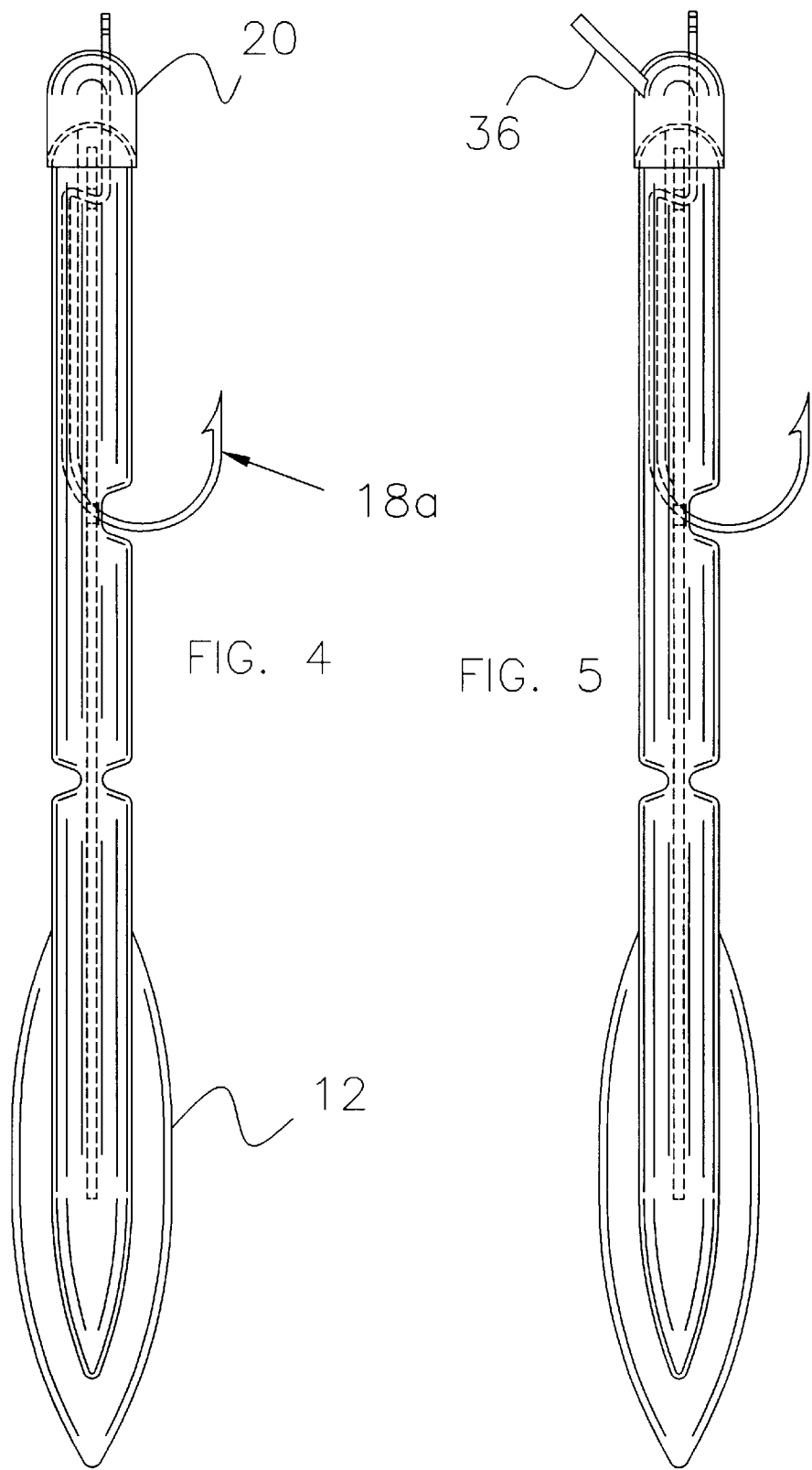

ARTIFICIAL FISHING LURE WITH RESILIENT CORE

BACKGROUND

1. Field of Invention

This invention relates to artificial fishing lures, specifically to an improved lure which can be cast great distances with rod and reel and retrieved, or trolled, with improved longevity while capable of being manufactured in sizes, shapes and proportions of natural prey such as eels, squid and baitfish. The lure can display swimming action that resembles that of wounded prey or other.

2. Description of Prior Art

Prior art bas described casting lures that are intended to display erratic motion while being retrieved through water. This type of motion simulates wounded bait that will incite an increased number of strikes from game fish.

The artificial lures in U.S. Pat. Nos. 4,998,372 and 6,170,190 and 6,094,855 and 5,894,692 and 4,392,161 and 4,312,148 are made of a one-piece homogenous flexible elastomeric material. The inventions of the prior art require that the lure be attached to the fishing line by inserting the hook into the elastomeric body and tying the fishing line to the hook.

In the prior art, the hook can very easily be torn out of the elastomeric material during a cast or strike by game fish.

In the prior art, the force between the hook and the elastomeric material must be kept below limits in order to prevent tearing, consequently, the maximum weight and subsequent size of the lure is restricted. This restriction of size prevents the lure from dimensionally approximating certain types of natural bait such as the American eel, a favorite food of striped bass for example.

Further, limiting the maximum force that can be applied to the lure by the hook and maximum weight of the lure directly limit the distance with which the lure can be cast. This is of great consequence to the fishing method of surf casting in salt water where distance casting is of particular importance.

In the prior art of U.S. Pat. No. 4,998,372 a plurality of recesses forming T-shaped cross sections in the elongated body provide for erratic motion between the adjacent elongated flexible body portions. The invention of the prior an is inherently weak at the T-shaped cross sections and is susceptible to ripping during casting or a strike from game fish. These weak sections impose limits on the maximum weight and size of the lure.

Further the T-shaped cross section of elastomeric material provides little restoring force after the lure deflects from its equilibrium shape and as a result the restoring response is sluggish and unanimated.

The artificial lure in U.S. Pat. No. 5,142,811 comprises a plastic elongated flexible body with an embedded elongated tubular casing to receive hook and line. In the prior art the tubular casing is inflexible and destroys the action of the lure intended to imitate live bait.

The artificial lure in U.S. Pat. Nos. 5,065,541 and 5,007,194 has a sheepskin body from which long fibers extend. The long fibers do not take on the appearance of a solid body, as is the case with the prey, which the lure is intended to resemble.

The artificial lures in U.S. Pat. Nos. 5,893,231 and 5,689,910 and 4,783,928 calls for the hook to be embedded into a thick cross section of rubber. This makes it increasingly difficult to set the hook into the fish as the rubber interferes.

OBJECTS AND ADVANTAGES

Accordingly, several objects or advantages of the artificial fishing lure of the current invention over artificial lures of prior art are as follows;

The artificial fishing lure of the current invention has a tear resistant core, which affords much increased strength and longevity.

The resilient core allows for the lure to be much larger in size thus better approximating certain types of bait. The resilient core permits the lure to be manufactured in greater sizes and weight without risk of ripping the hook from the lure. This will provide for improved casting distances.

Grooves in the artificial fishing lure do not interrupt the continuous reinforcing by the core so that the integrity of the lure is not affected.

The core can have elastic properties, which provide for a greater restoring force to the artificial fishing lure thus imparting a more lifelike action. The core of the current invention is flexible and serves to enhance the action of the lure.

Lure can have an elongated flexible body substantially equal to natural bait and prey in size, shape, and proportions.

The artificial fishing lure of the current invention requires only that the hook pierce the core of thin section so that minimal interference is made to the process of setting the hook. Also the aperture that receives the bend can be slotted to further reduce the interference of the lure while setting a hook in a fish.

The artificial lure of the current invention can be easily augmented with either a weight or a vane control swimming and diving performance.

The current invention can accept multiple hooks in order to better hook the intended predator.

The swimming action of the current invention can be easily modified by cutting or removing parts of the body. The action of the lure can be optimized by the end user to suit specific fishing conditions or the intended game fish. Modifications to the body can be grooves of any shape, number or location.

Further objects and advantages of the artificial fishing lure of the current invention will become apparent from consideration of the drawings and ensuing description.

SUMMARY

An artificial fishing lure having a tear-resistant core capable of receiving one or more hooks in apertures in the core so that hooks are perpendicular to the core. An elongated flexible body is affixed to the core. The body may have disconformities or grooves in the cross section in order to promote an intended action while retrieved through the water.

DRAWING FIGURES

The features of the invention believed to be novel and the elements characteristic of 7 the invention are set forth with particularity in the appended claims. The figures are for illustration purposes only and are not drawn to scale.

FIG. 4 is an isometric view of an alternative embodiment of the invention with a weight.

FIG. 5 is an isometric view of an alternative embodiment of the invention with a vane.

Figure 1:
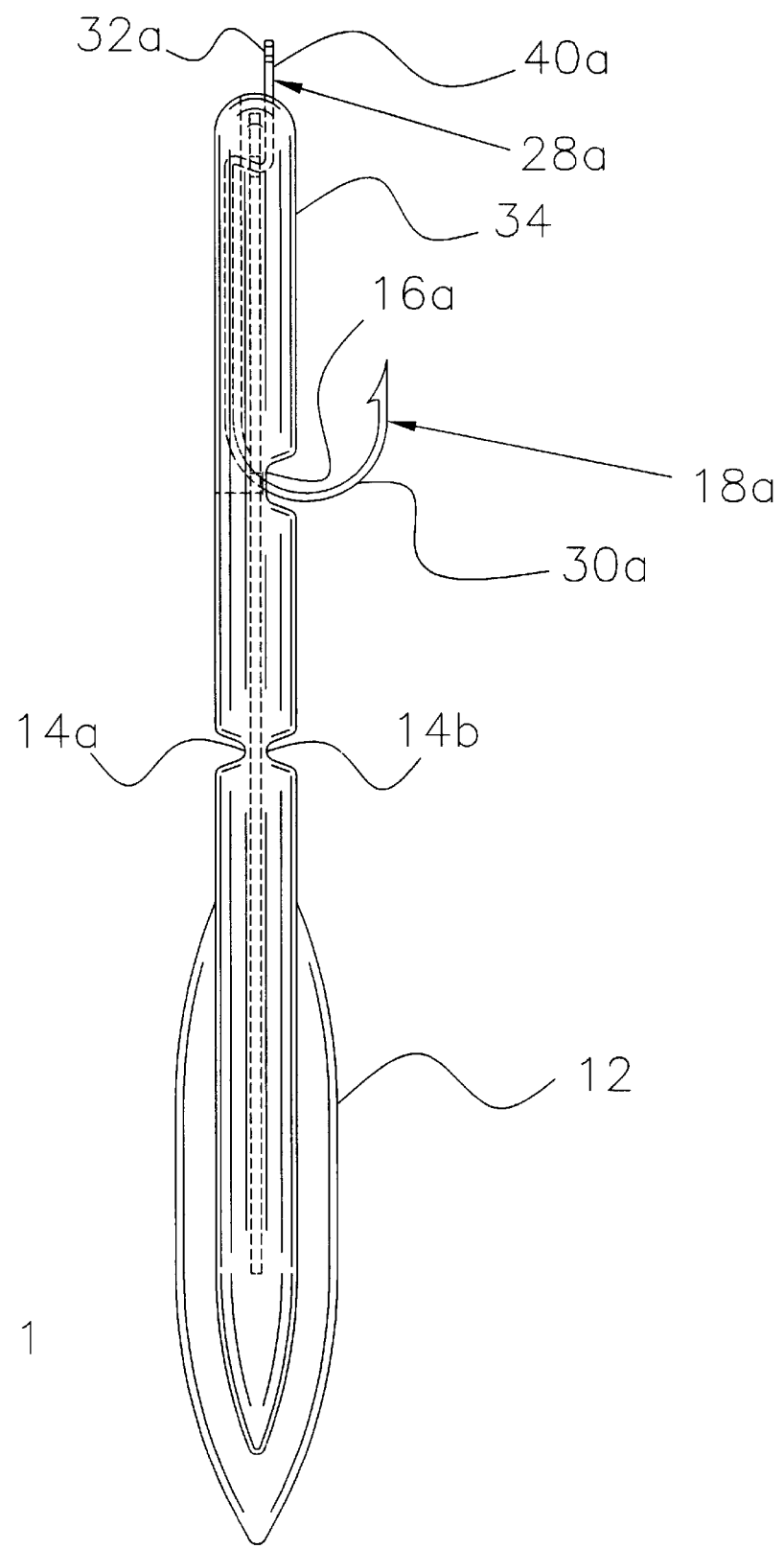
FIG. 1 is an isometric view of the preferred embodiment of the invention.

| Reference Numerals in Drawings: | |
|---|---|
| 10. | core |
| 12. | body |
| 14a. | groove |
| 14b. | groove |
| 16a. | relief |
| 16b. | relief |
| 18a. | hook |
| 18b. | hook |
| 20. | weight |
| 22a. | slot |
| 22b. | slot |
| 24a. | aperture |
| 24b. | aperture |
| 24c. | aperture |
| 24d. | aperture |
| 26a. | lateral offset |
| 26b. | lateral offset |
| 28a. | shank |
| 28b. | shank |
| 30a. | bend |
| 30b. | bend |
| 32a. | eye |
| 32b. | eye |
| 34. | forward End |
| 36. | vane |
| 38. | fishing line |
| 40a. | upper shank |
| 40b. | upper shank |
| 42a. | lower shank |
| 42b. | lower shank |

DESCRIPTION OF PREFERRED EMBODIMENT OF INVENTION

Figure 2:
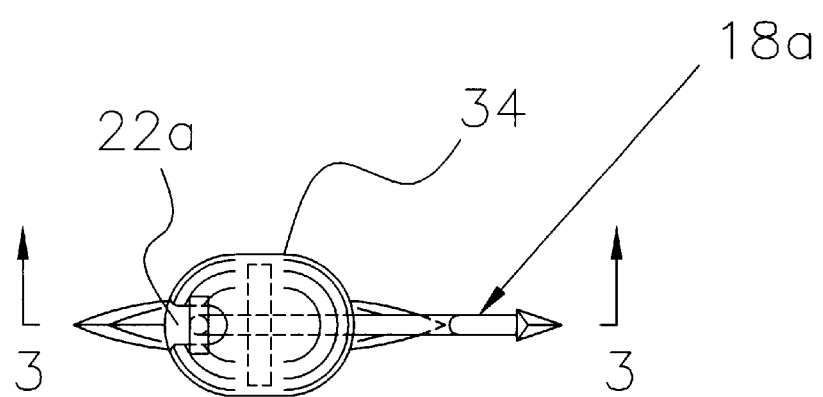
FIG. 2 is an isometric view of the preferred embodiment of the invention.

FIG. 1 and FIG. 2 are isometric views of a preferred embodiment of the invention. A core 10 is thin with an elongated shape. An elongated flexible body 12 is fixed to one or more surfaces of core 10. Body 12 and core 10 form a flexible composite. Body 12 has a forward end 34. The cross section of body 12 varies along a longitudinal direction due to disconformities or a groove 14a and 14b located in composite structure of core 10 and body 12.

A hook 18a has an eye 32a connected to a shank 28a, which is connected to a bend 30a. Shank 28a has an upper shank 40a connected to a lateral offset 26a, which is connected to a lower shank 42a. Core 10 has an aperture 24a near forward end 34 and an aperture 24b at a further predetermined distance from forward end 34. Lateral offset 26a and bend 30a pass through and are seated in apertures 24a and 24b respectively so that hook 18a is substantially perpendicular to core 10.

Figure 3:
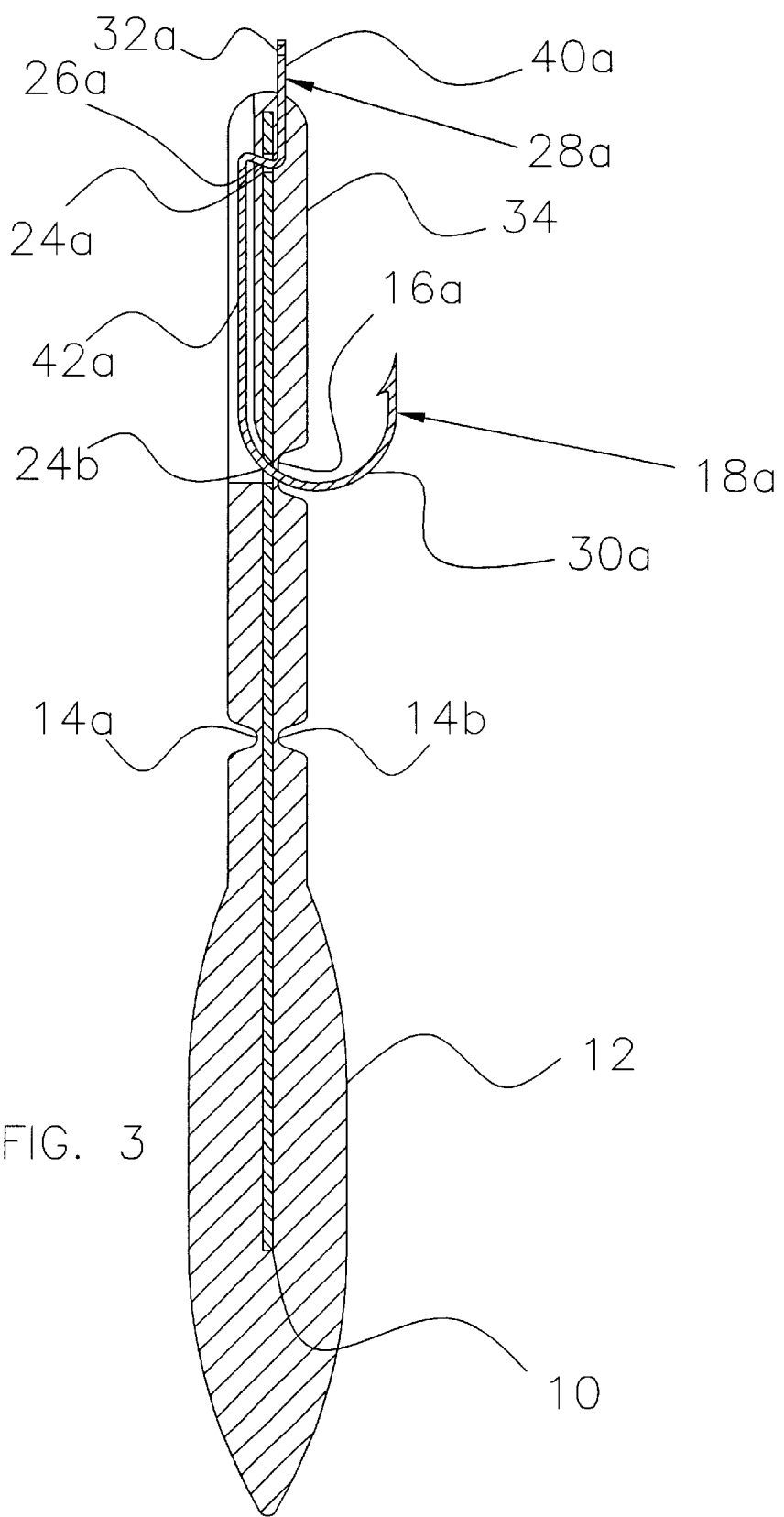
FIG. 3 is a section view of the preferred embodiment of the invention.

FIG. 3 is a sectional view of the preferred invention. Body 12 has a relief 16a located adjacent to aperture 24b. Body 12 has a slot 22a running parallel to lower shank 42a. Lower shank 42a is located in slot 22a.

OPERATION OF PREFERRED EMBODIMENT OF INVENTION

FIG. 1 and FIG. 2 are isometric view of the preferred embodiment of the invention. FIG. 2 is a sectional view of the preferred invention. Core 10 of the current invention facilitates the indirect attachment of body 12 and hook 18a. Core 10 provides a tear resistant intermediary means of attachment. Apertures 24a and 24b occur in core 10 and provide a means of attachment for hook 18a at lateral offset 26a and bend 30a. In turn, core 10 is substantially attached to body 12. Core 10 reinforces body 12 against tearing or damage. While casting and retrieving the lure of the current invention, the force of hook 18a is substantially transmitted to core 10 at apertures 24a and 24b. The mechanical properties of core 10 prevent damage to core 10. The force transmitted from core 10 to body 12 is done over a large contact area between core 10 and body 12. As a result the force per unit area on body 12 is very low and does not exceed the mechanical properties of body 12.

During retrieval through water, body 12 is able to locally pivot or oscillate about lateral offset 26a and bend 30a at apertures 24a and 24b respectively.

Body 12 is made in the shape and size of the intended prey and acts to attract fish. Grooves 14a and 14b in body 12 bring about a predetermined bending and swimming action of body 12 in order to further attract a strike from the intended fish. When retrieved through the water, the lure of the current invention can display erratic flexing about the areas of cross-sectional disconformities or grooves 14a and 14b.

The current invention accommodates easily, modifying the swimming characteristics by the user by removing sections of body 12 to reduce the stiffness of the lure.

Figure 8:
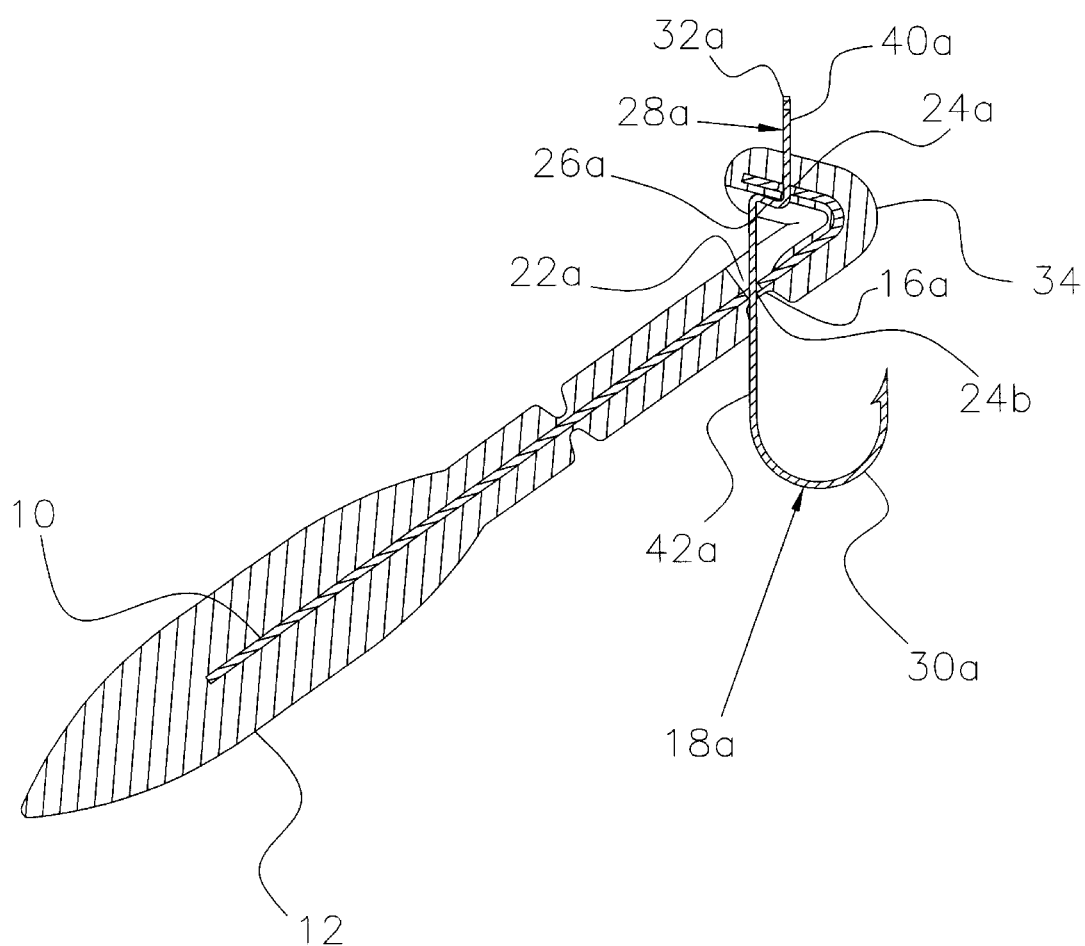
FIG. 8 is an isometric view of the preferred embodiment during a strike from a fish.

During the act of a fish being impaled by hook 18a, body 12 and core 10 bends from the position shown in FIG. 1 to the position shown in FIG. 8. Relief 16a and slot 22a allow clearance between hook 18a and body 12. Slot 22a also allows upper shank 40a to be recessed into body 12 so that more of bend 30a is exposed to the fish during the initial strike.

Description of Alternate Embodiment of Invention with a Weight

FIG. 4 is an isometric view of an alternate embodiment of the invention with a weight 20. A weight 20 is made of dense material and has a predetermined mass. Weight 20 is fixedly attached to upper shank 40a of the preferred embodiment.

Operation of Alternate Embodiment of Invention with a Weight

FIG. 4 is an isometric view of an alternate embodiment of the invention with weight 20. Weight 20 aids in achieving greater distance and accuracy when casting the lure with rod and reel. While moving through the water during trolling, jigging, retrieving or other method of fishing, weight 20 serves to lower the lure in the water column to a predetermined depth thereby presenting the lure to those fish which may be nearer to the bottom of the body of water. Weight 20 can also be used to control the swimming action of the lure.

Description of Alternate Embodiment of Invention with a Vane

FIG. 5 is an isometric view of an alternate embodiment of the invention with a paddle or a vane 36. Vane 36 is substantially flat and rigid. Vane 36 extends forwardly and downwardly from a point of fixed attachment to upper shank 40a of the preferred embodiment.

Operation of Alternate Embodiment of Invention with a Vane

FIG. 5 is an isometric view of an alternate embodiment of the invention with a vane 36. While moving through the water during trolling, jigging, retrieving or other method of fishing, vane 36 serves to control the swimming action of the lure. Vane 36 can also be used to lower the lure in the water column to a predetermined depth.

Description of Alternate Embodiment of Invention with Multiple Hooks

Figure 6:
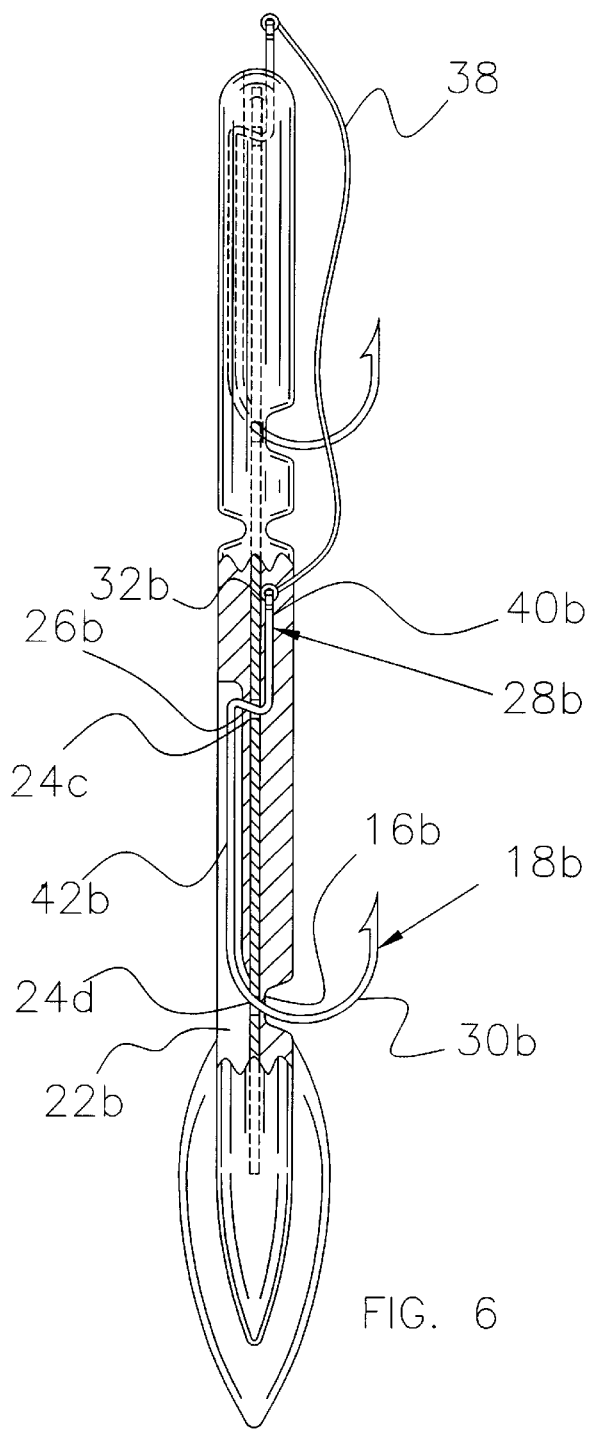
FIG. 6 is an isometric view of an alternative embodiment of the invention with multiple hooks.

FIG. 6 is an isometric view of an alternate embodiment of the invention with multiple hooks 18a and 18b. A hook 18b has an eye 32b connected to a shank 28b, which is connected to a bend 30b. Shank 28b has an upper shank 40b connected to a lateral offset 26b, which is connected to a lower shank 42b. Core 10 has an aperture 24c located at a predetermined distance from aperture 42b and an aperture 24d at a further predetermined distance from aperture 24c. Lateral offset 26b and bend 30b pass through and are seated in apertures 24c and 24d respectively.

Body 12 has a relief 16b located adjacent to aperture 24d. Body 12 has a slot 22b running parallel to lower shank 42b. Lower shank 42b is located in slot 22b. A fishing line 38 attaches eye 32a to eye 32b.

Operation of Alternate Embodiment of Invention with Multiple Hooks

FIG. 6 is an isometric view of an alternate embodiment of the invention with multiple hooks 18a and 18b. Core 10 provides a tear resistant means of attachment for hooks 18a and 18b. Apertures 24b and 24c occur in core 10 and provide a means of attachment for hook 18b at lateral offset 26b and bend 30b. While casting and retrieving the lure of the current invention the force of hook 18b is substantially transmitted to core 10 whose mechanical properties do not allow core 10 to be damaged.

Relief 16b prevents body 12 from obstructing hook 18b from a fish during a strike. Slot 22b allows upper shank 40b to be recessed into body 12 so that more of bend 30b is exposed to the fish.

Figure 7:
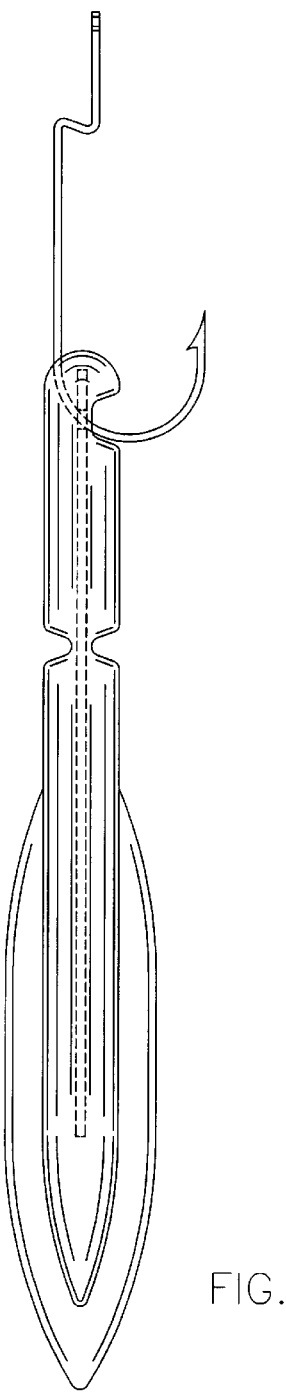
FIG. 7 is an isometric view of an alternative embodiment of the invention with a simplified method of attaching the hook to the core.

Description of Alternate Embodiment of Invention with a Simplified Hook of Attachment FIG. 7 is an isometric view of an alternate embodiment of the invention with a simplified method of attachment of hook 18a. Bend 30a is seated in aperture 24a of the preferred embodiment.

Operation of Alternate Embodiment of Invention with a Simplified Hook Attachment FIG. 7 is an isometric view of an alternate embodiment of the invention with a simplified method of attachment of the hook 18a. Core 10 provides a tear resistant means of attachment for hook 18a. Aperture 24a occurs in core 10 and provides a means of attachment for hook 18a at bend 30a. While casting and retrieving the lure of the current invention the force of hook 18a is substantially transmitted to core 10 whose mechanical properties do not allow core 10 to be damaged.

Conclusion, Ramifications, and Scope of Invention

Accordingly, the reader will see that the artificial fishing lure of the current invention can be provided in large sizes and weight while exhibiting increased longevity during repeated casting, retrieving and strikes from fish.

Although the description above contains many specifications, these should not be construed as limiting the scope of the invention but as merely providing illustrations of some of the presently preferred embodiments of this invention. For example, the core can be made in the form of a thin film or a mesh made of thin strands. The orientation and position of the core within the body can vary. The size and relative size of the physical features of the current invention can be varied. The color of the core, body, weight and vane can vary, the number and location of hooks employed in a lure can vary. Various methods of attaching the hook to the core can be utilized. The shape of the core, body, weight and vane, can vary. The size, shape, quantity, orientation and location of the grooves in the body can vary. The weight and density of any of the features of the invention can vary. The current invention can be employed in many methods of fishing to include casting, trolling and jigging or other.

Thus, the scope of the invention should be determined by the appended claims and their legal equivalents, rather than by the examples given.

I claim:

1. An artificial fishing lure comprising:
   a. a core made of pliable and tear resistant material having an elongated shape and a forward end, said core having a first core surface and a second core surface, wherein said first and second core surfaces lie opposite one another and define a core thickness therebetween,
   b. a body made of pliable material fixedly joined to said core substantially along the length of said body,
   c. a hook, further including an eye, a lower shank, a bend, an upper shank, and a lateral offset between said lower shank and said upper shank,
   d. said lateral offset traversing a first aperture in said core in said forward end, wherein said first aperture extends from said first core surface to said second core surface, such that said lateral offset traverses the entire thickness of said core, said upper shank running longitudinally alongside said first core surface, and said lower shank running longitudinally alongside said second core surface,
   e. said bend traversing a second aperture in said core at a predetermined longitudinal distance from said first aperture,
   f. said book being substantially perpendicular to said core.

2. An artificial fishing lure as recited in claim 1, wherein said core is made of mesh.

3. An artificial fishing lure as recited in claim 1, wherein said body has a cross sectional area perpendicular to a longitudinal axis, said cross sectional area varying due to substantially transverse grooves where said body is fixedly joined to said core, wherein the longitudinal stiffness varies accordingly along the length of said body.

4. An artificial fishing lure as recited in claim 1, wherein said body includes a diminished cross section perpendicular to a longitudinal axis due to a relief in said body at said second aperture, wherein said body does not inhibit said core from translating along said bend when urged by a fish so as to minimize the potential of physical interference between said body and a fish.

5. An artificial fishing lure comprising:
   a. a core made of pliable and tear resistant mesh having an elongated shape and a forward end, said core having a first core surface and a second core surface, wherein said first and second core surfaces lie opposite one another and define a core thickness therebetween, b. a body made of pliable colored rubber fixedly joined to said core substantially along the length of said body, c. said body having a cross sectional area perpendicular to a longitudinal axis, said cross sectional area varying due to substantially transverse grooves in areas where said body is fixedly joined to said core, whereby the longitudinal stiffness varies accordingly along the length of said body, d. a book, further including an eye, a lower shank, a bend, an upper shank, and a lateral offset between said lower shank and said upper shank, e. said lateral offset traversing a first aperture in said core in said forward end, wherein said first aperture extends from the first core surface to the second core surface, such that said lateral offset traverses the entire thickness of said core, said upper shank running longitudinally alongside said first core surface, and said lower shank running longitudinally alongside said second core surface, f. said bend traversing a second aperture in said core at a predetermined longitudinal distance from said first aperture, g. said hook being substantially perpendicular to said core, h. said body including a longitudinal slot within which said lower shank may pass, such that moving said lower shank toward said core when said lower shank is positioned in said longitudinal slot thereby pushes said hook further through said second aperture and further exposes said bend, and i. said body including a diminished cross section perpendicular to a longitudinal axis due to a relief in said body at said second aperture, wherein said body does not inhibit said core from translating along said bend when urged by a fish so as to minimize the potential of physical interference between said body and a fish.

6. An artificial fishing lure as recited in claim 1, wherein said body includes a longitudinal slot within which said lower shank may pass, such that moving said lower shank toward said core when said lower shank is positioned in said longitudinal slot thereby pushes said hook further through said second aperture and further exposes said bend.

7. An artificial fishing lure as recited in claim 1, further including:

a. a second hook, said second hook including an eye, a lower shank, a bend, an upper shank, and a lateral offset between said lower shank and said upper shank, b. said lateral offset of said second hook traversing a third aperture in said core at a predetermined longitudinal distance from said second aperture, wherein said third aperture extends from said first core surface to said second core surface, such that said lateral offset of said second hook traverses the entire thickness of said core, said upper shank of said second hook running longitudinally alongside said first core surface, and said lower shank of said second hook running longitudinally alongside said second core surface, c. said bend of said second hook traversing a fourth aperture in said core at a predetermined longitudinal distance from said third aperture, d. said second hook being substantially perpendicular to said core, e. a connective means for conveying loads imposed on said second hook to said hook.

8. An artificial fishing lure as recited in claim 7, wherein said connective means further includes a fishing line tied to said eye of said second hook and to said eye of said hook.

9. An artificial fishing lure as recited in claim 1, further including a controlling means of imparting a wobbling and or diving motion to said body while moving said body through water, whereby a predetermined swimming action is achieved.

10. An artificial fishing lure as recited in claim 9, wherein said controlling means includes a vane forwardly extending while fixedly attached to underside of said hook.

11. An artificial fishing lure as recited in claim 9, wherein said controlling means includes a predetermined weight fixedly attached to said hook, whereby controlling balance or diving while moving said body through water.

* * * * *